United States Patent

[11] 3,625,510

[72] Inventor Paul Szigety
 170 Winnick Ave., Las Vegas, Nev. 89109
[21] Appl. No. 41,209
[22] Filed May 28, 1970
[45] Patented Dec. 7, 1971

[54] THEATRICAL SCREEN FOR COMBINING LIVE ACTION AND PROJECTED PICTURES
3 Claims, 5 Drawing Figs.
[52] U.S. Cl. ................................................ 272/21, 272/10
[51] Int. Cl. ................................................. A63j 5/02
[50] Field of Search ........................................... 160/120, 172, 201, 202, 203; 254/141; 350/117; 352/85, 89; 272/9, 10, 11, 12, 21, 22, 23

[56] References Cited
UNITED STATES PATENTS
3,072,410 1/1963 Simjian ......................... 273/105.1 X
2,848,045 8/1958 Bennett ......................... 160/172
3,442,508 5/1969 Rudas ............................ 272/21
3,493,032 2/1970 Brown ........................... 160/201

Primary Examiner—Richard C. Pinkham
Assistant Examiner—R. T. Stouffer
Attorney—Jerry R. Seiler ABSTRACT: A theatrical screen for reflecting projected images and through which objects may pass comprises a plurality of substantially vertically extending elongated elastic strips the upper ends of which strips are secured to a frame while the lower ends are attached to movable guides. The guides are located within or cooperate with a guide channel and may be moved along the guide channel which extends laterally across a stage platform. A large object such as a vehicle or the like may be moved through the screen between a pair of parted elastic strips which thereafter will return to their normal substantially vertical position.

PATENTED DEC 7 1971

INVENTOR.
PAUL SZIGETY
BY
ATTORNEY

INVENTOR
PAUL SZIGETY
BY
ATTORNEY

THEATRICAL SCREEN FOR COMBINING LIVE ACTION AND PROJECTED PICTURES

BACKGROUND OF THE INVENTION

For many theatrical performances, it is desirable to incorporate with image projections on a screen, live performers and/or real props. Unusual and sensational impressions can be obtained by using screen projections and real objects in combination. For example, an event which includes a sequence of illustrations of a moving object projected on a screen may be interrupted or concluded with the object being projected physically appearing on the stage. Such a presentation is particularly impressionable and sensational where the projected object appears to move directly toward the viewer and then appears in actual form on the stage as if coming out of the screen.

Various staging devices have been attempted or suggested to provide a cooperation between projected images and actors. One such method is described in U.S. Pat. No. 3,084,933 in which a portion of the projection screen is actually shifted out of the normal plane of the screen so that live action can pass through the opening provided by the shifted section. However, the movement of the screen section disrupts the projected image and often requires camouflaging of the shifting screen section or audience distraction to another portion of the screen so that screen movement will not be noticed Obviously, such camouflage or distraction necessitates at least some inconvenience in the production. The requirement of a movable screen section suitable for providing apertures large enough for a vehicle, boat or similar props to pass through is obviously most inconvenient. Where the passage of the vehicle through the screen is not desired to be camouflaged but instead is to be the center of attention, the slidable screen section as described in the aforesaid patent is generally unsuitable.

More recently in U.S. Pat. 3,442,508, is described a screen composed of a plurality of vertically arranged parallel strips of stretchable resilient material. The upper and lower edges of the strips are secured to an upper and lower frame member respectively. Because the strips are stretchable an actor can move from the backside of the screen to the front side merely distorting a strip so as to move between it and an adjacent strip. In such a manner, distortion of the screen during projection of a film is minimized thereby offering advantages over the screen described in the earlier patent. However, with the latter screen there is essentially no way in which objects much larger than an actor can be moved through the screen without damaging it. It is to the improvement of such a screen that the present invention is directed.

SUMMARY OF THE INVENTION

The present invention comprises a screen through which both small and large objects may pass. The screen comprises a plurality of elongated elastic strips which extend from an upper frame member of a stage setting or screen frame to approximately a stage platform. The upper end of each strip is secured to the frame member while the lower end is fastened to a movable guide. The guides are aligned along a channel which extends substantially laterally across the stage platform. When desired an object may pass from the backside of the screen between two adjacent and parted elastic strips.

The use of such a screen is particularly effective where during a projection sequence, it is desired to have a real object move from behind the screen to be viewed by an audience. For example, a sequence of projected images on the screen showing a vehicle traveling toward the viewer may terminate with an actual vehicle passing through the screen, giving the illusion that it has emerged from the projected image itself. Due to the components and features of the screen to be more fully described hereinafter, vehicles such as automobiles, trucks, boats, and large animals and the like may be passed through the screen easily with essentially little or no production inconvenience and which screen elements return to their original position following passage of the object. Such advantages will become more evident from the following description.

DETAILED DESCRIPTION OF THE INVENTION

Figure 1:
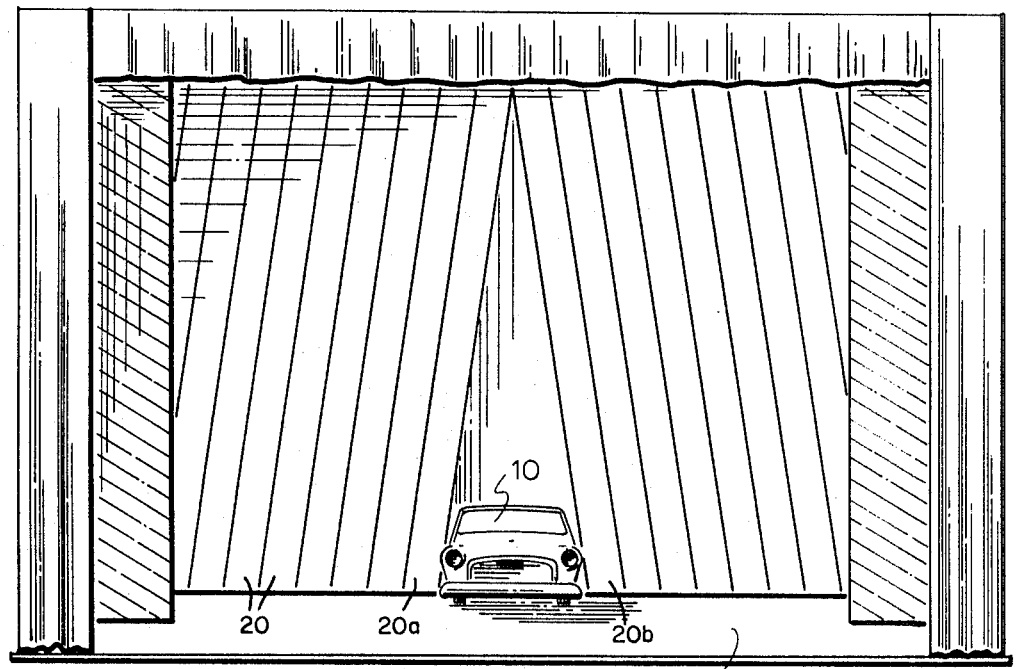
FIG. 1 is a front elevational view of a theatrical stage incorporating the screen of the invention.
Figure 2:
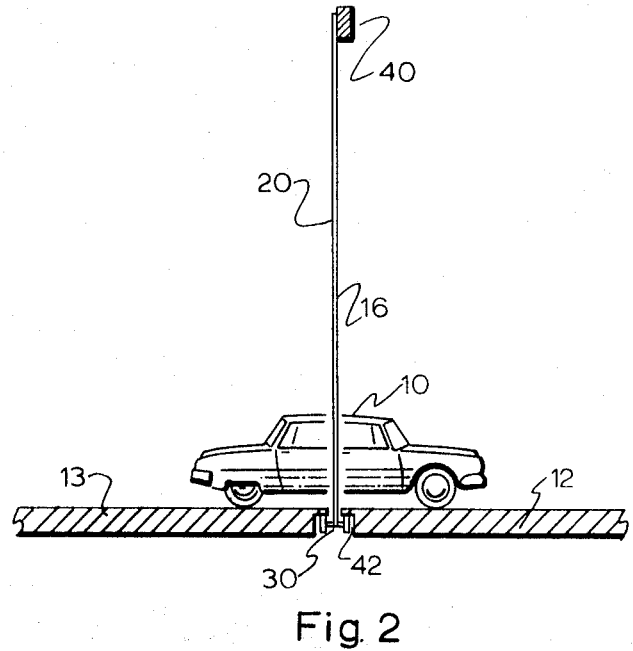
FIG. 2 is a side view of FIG. 1.

Referring to FIGS. 1 and 2, the stage setting comprises a downstage platform 12 and an upstage platform 13 divided by the screen 16. The screen 16 is composed of a plurality of elastic strips 20 which extend generally from the stage platform level to an upper frame member 40. The upper frame member 40 may be a portion of a screen frame or of some part of the stage equipment.

Figure 3:
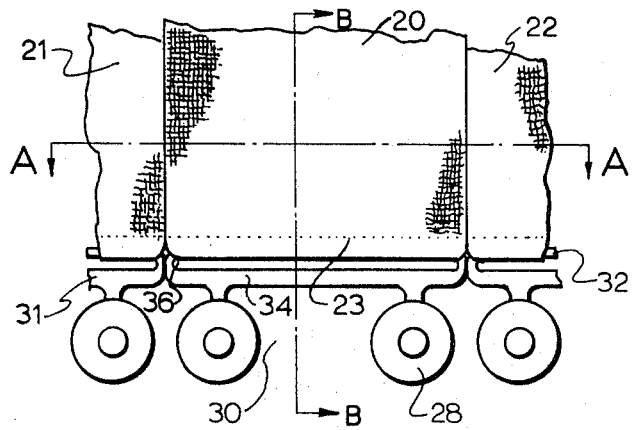
FIG. 3 is a front elevation of the bottom portion of elastic strips attached to guides.
Figure 4:
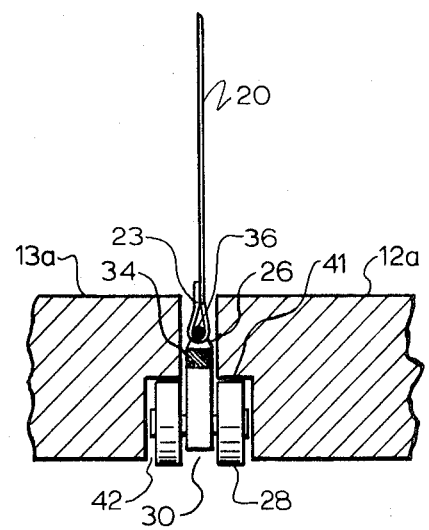
FIG. 4 is a side sectional view taken along line B—B of FIG. 3.
Figure 5:
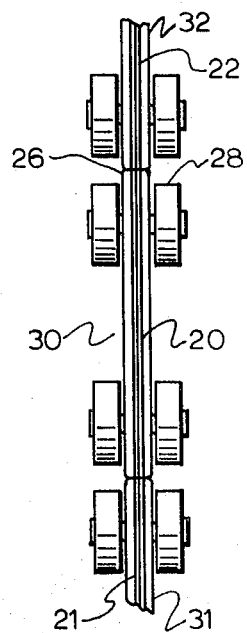
FIG. 5 is a vertical elevation taken along line A—A of FIG. 3.

The upper end of each strip 20 is secured to the frame member 40 so that it will remain fixed in that location. The ends may be tacked, stapled or similarly secured. The lower end of each strip 20 is attached to a movable guide assembly 30. These assemblies, shown in greater detail in FIGS. 3-5 are in a guide channel 42 which acts as a track in which the guide assemblies 30 travel.

The guide channel 42 usually extends laterally across a stage and shown in FIG. 2, separates the backstage platform 13 and the frontstage front or downstage platform 12. It will be appreciated that "backstage" and "downstage" are merely relative terms. However, for purposes of this explanation, the downstage area is considered to be that which is in front of the screen 16 and in view of an audience.

The individual elastic strips 20 are positioned in the screen 16 as shown in FIG. 1 so that their flat sides lie in a plane generally normal to the audience or viewers. However, it should also be appreciated that a curved or arced screen may also be used, for example, in a cinerama-type projection stage. With all strips 20 in a normal, most relaxed position lengthwise edges of adjacent strips are contacting or nearly contacting along their length to provide an essentially uniform screen. The edges of adjacent strips may slightly overlap or even be slightly parted so long as the quality of the image produced on the screen is not significantly altered and the screen appears to be substantially uniform to a viewer.

In a preferred use of the invention, the screen 16 is illuminated with a projected image from a projector. An image may be still such as by the use of a slide projector or may incorporate a series of views in sequence such as in the form of a motion picture. During projection, an object may be passed from one side to the other side between any pair of adjacent elastic strips 20. In FIGS. 1 and 2, an automobile 10 is illustrated passing from the backstage to the frontstage area on the platforms 13 and 12 respectively through the screen 16 between parted adjacent elastic strips 20a and 20b.

When it is desired to move an object through the plane of the screen 16 this is accomplished by merely advancing the object such as the automobile 10 to the screen 16 whereupon a pair of adjacent elastic strips 20a and 20b are parted and continue to part until the distance between the parted strips is sufficient to allow the object 10 to pass between them. This separation or parting of two adjacent strips is easily accomplished because the strips are elastic and the lower edge of each strip is laterally movable because of attachment to a movable guide assembly 30. A slight pressure on a strip, unless centered between the edges, will cause it to move to one side. Continued lateral pressure will then cause that strip to be further displaced from its normal substantially vertical rest position. FIGS. 3 and 5 illustrate adjacent strips 20, 21 and 22 and guide assemblies 30, 31 and 32 in a normal, rest position in which the strips are edge to edge and guide assemblies are end to end as shown. Again, the guide assemblies are free to move in either direction along the channel 42. Because of this lateral freedom of movement, separation of adjacent strips may occur at any location on the screen. Once separation begins, force from the object 10 moving through the screen 16 forces the strips on each side of the object and the respective guide assemblies to continue to be moved laterally. In other words, noting FIGS. 3 and 5, as an object begins to pass between strips 20 and 21, strip 20 and 22 and guide assemblies 30 and 32 will be moved in one direction while movement of strips 21 and guide assembly 31 will be in the opposite direction. Further, because of the end to end relationship of the guide assemblies, movement in any direction forces an end of a guide body against an adjacent guide body and thus the movement of guide assemblies along the guide channel is propagated.

A strip 20 should be attached to a guide body 26 so that at least slight and uniform tension on the elastic material is maintained when the strip is in its normal and most relaxed position, i.e., substantially vertical between the upper frame member 40 and the channel 42. In this position, the guide assembly 30 will be biased or forced upwardly and the rollers 28 will remain in contact with the upper surface 41 of the channel 42 as shown in FIG. 4. Thus, the surface 41 acts as a track for the guide assemblies.

When a strip is displaced from the normal substantially vertical position, the elastic is stretched further as the object continues to pass through the screen. Once the object has passed and the lateral pressure on the strips is released, because of their elastic feature, they return quickly to their normal substantially vertical rest position.

As shown, a movable guide assembly 30 to which the lower end of a strip 20 is attached incorporates a guide body 26 and rollers 28. It should be appreciated that various equivalent guide means may be used to accomplish the same purpose of moving the ends of the strips 20 laterally across the stage for the intended purpose. Thus, the particular guide assemblies shown although preferred are not intended as limiting the inventive concept.

It has been found that a roller associated with each end of a guide assembly 30 as shown in FIG. 3 is preferred so as to keep with the assembly level and prevent the assemblies from jamming within the channel 42. Even further, it is preferred that two such rollers 28 be located at each end of the guide body 26 as shown in FIG. 5 to yield optimum performance including ease of lateral movement and return of the strips to their normal position after an object has passed through the screen 16. However, other means to assist in movement of the guide assembly and cooperating with the guide channel may be used instead of the rollers, for example, Teflon or other low friction runners, ball bearings, etc. For this purpose, guide channel 42 may have guide assembly contact surface coated with a low friction material such as Teflon, i.e.: polytetrafluoroethylene or similar fluorocarbon resins.

The manner in which the lower end of a strip 20 is attached to the guide body 26 is not particularly critical although a convenient means is shown in FIGS. 3 and 4. The guide body 26 shown includes an upper rod 36 and a lower body section 34. The end of the strip 20 is passed around the upper rod 36 and the edge of the strip 20 is then sewn or tacked forming a seam 23. However, other equivalent means of attachment such as by stapling, etc., may be used which will also depend on the shape or form of the guide body.

The depth at which the channel 42 is located below the backstage area surface 13a and the frontstage area surface 12a (FIG. 4) depends on the dimensions of the guide body 26. It is preferred that the guide body 26 be essentially completely below the plane of the surfaces 12a and 13a to prevent possible damage to the guide assembly 30 while relatively large objects are passing through the screen 16. This is especially true where the shape of the relatively large object is such that a first object portion passing through the screen would be at the stage surface whereby damage to the guide body 26 could occur prior to sufficient separation of guide bodies. However, the channel could be elevated above the stage surface, if a substantially uninterrupted surface is not required. A ramp could be used to protect the guide assemblies and to aid in moving the object past the screen.

The material used for a strip 20 must be of sufficient elasticity so that when properly attached to a guide assembly and upper frame member, adjacent strips 20a and 20b may be easily separated without undue pressure and return to their normal vertical position quickly after the object has passed through. The front surface of each strip 20 may also be provided with materials which will enhance illumination of a picture projected thereon, such materials being well understood by those skilled in the art. The size or width of individual strips is not critical. However, relatively thin strips approximately 3 inches wide are preferred because of availability and good elastic properties.

In order to assist in the return of the guide assemblies and in turn the elastic strips to their normal position, springs or similar means may also be used. For example, springs may be placed at both ends of a channel 42 so as to assist in returning the guide assemblies to their normal position once an object has passed through the screen 16. However, it should also be appreciated that such spring device should be flexible or light duty so as not to unduly restrict the lateral movement of the guide assemblies which in turn could upset the ease at which the strips could be parted and separated. Easily stretchable elastic bands may also be attached to adjacent guide assemblies to aid the assemblies to return to their normal adjacent and aligned position in the channel 42. The guide assemblies may also be provided with aligning aids, cushion means, etc., to assist in prevention of jamming.

An alternative embodiment of the invention described is to utilize strips having their lower ends fixed to a frame or the like, while the upper ends are attached to movable guides. Thus, an object such as a rocket or similar flying object may be passed through an upper portion of the screen. If full screen versatility is desired, both upper and lower strip ends may be attached to movable guides with one set of the guides, i.e., upper or lower, held to prevent lateral strip movement at that end. For example, a removable block or clamp at each end of a guide channel would suffice. In that way, separation of strips at either the lower or upper screen area could be selected as desired.

It will be evident that the screen of the invention hereinabove described offers a number of advantages over previously suggested screens. For example, where relatively large objects such as vehicles, boats or large animals are passed through the screen this may be accomplished with ease and without the necessity of distracting an audience to some other area of the stage. The invention is useful in productions where a projected image gives the appearance of a large object moving toward the viewer, and which object then appears from behind the screen at the desired time in the film sequence. Thus, it will be appreciated that the ability to bring such large objects easily through the screen with a minimum of effort will afford highly effective presentations, such as for industrial and commercial stage presentations where large equipment or apparatus can emerge from behind the screen with the size of the object being limited essentially only by the size of the stage. On the other hand, the screen need not be used solely in cooperation with a projected image but can be simply a screen, ornamented with paintings, designs, etc., or as a stage backdrop or background.

These, as well as other advantages will be evident to those skilled in the art for utilizing the improved screen herein described.

I claim:

1. A stage projection screen consisting of:
   a. a laterally extending upper frame member;
   b. a lower guide channel extending laterally across a stage opposite said upper frame member;

c. a plurality of laterally movable guide means disposed within said guide channel having low friction engagement therewith for travel therealong; and d. a plurality of flat surfaced and taut elastic strips normally held in a rest position extending substantially perpendicular between said upper frame member and said guide means wherein the upper strip ends are fixedly secured to the upper frame member and the lower strip ends are attached to said laterally moveable guide means, said low friction engagement between said guide means and said guide channel being such that the lower ends of adjacent strips may be substantially laterally displaced relative to one another in response to movement of a large object against one side of said screen, said strips cooperating to form a projection screen wherein the flat strip surfaces are maintained in substantially the same plane.

2. The screen of claim 1 wherein each of the said guide means comprises a guide body to which is attached the lower end of said strip.

3. The screen of claim 2 having rollers attached to said guide body and disposed within said guide channel for travel therealong.